United States Patent
Gupta et al.

(10) Patent No.: US 11,605,388 B1
(45) Date of Patent: Mar. 14, 2023

(54) SPEAKER CONVERSION FOR VIDEO GAMES

(71) Applicant: Electronic Arts Inc., Redwood City, CA (US)

(72) Inventors: Kilol Gupta, Redwood City, CA (US); Dhaval Shah, Redwood City, CA (US); Zahra Shakeri, Mountain View, CA (US); Jervis Pinto, Toronto (CA); Mohsen Sardari, Burlingame, CA (US); Harold Chaput, Castro Valley, CA (US); Navid Aghdaie, San Jose, CA (US); Kazi Zaman, Foster City, CA (US)

(73) Assignee: Electronic Arts Inc., Redwood City, CA (US)

( * ) Notice: Subject to any disclaimer, the term of this patent is extended or adjusted under 35 U.S.C. 154(b) by 190 days.

(21) Appl. No.: 17/093,171

(22) Filed: Nov. 9, 2020

(51) Int. Cl.
*G10L 15/02* (2006.01)
*G10L 17/04* (2013.01)
(Continued)

(52) U.S. Cl.
CPC ............ *G10L 17/04* (2013.01); *A63F 13/215* (2014.09); *A63F 13/424* (2014.09); *G10L 15/005* (2013.01)

(58) Field of Classification Search
None
See application file for complete search history.

(56) References Cited

U.S. PATENT DOCUMENTS

| 11,217,223 | B2* | 1/2022 | Gkoulalas-Divanis ...................... G10L 21/00 |
| 11,410,684 | B1* | 8/2022 | Klimkov ................. G10L 25/78 |
| 2014/0278417 | A1* | 9/2014 | Chen ....................... G10L 21/00 704/246 |

(Continued)

OTHER PUBLICATIONS

Arik, Sercan O., et al. "Neural Voice Cloning with a Few Samples." arXiv preprint arXiv:1802.06006 (2018), Retrieved from https://arxiv.org/abs/1802.06006v3.

(Continued)

*Primary Examiner* — Jakieda R Jackson
(74) *Attorney, Agent, or Firm* — Gray Ice Higdon

(57) ABSTRACT

This specification describes a computer-implemented method of generating speech audio for use in a video game, wherein the speech audio is generated using a voice convertor that has been trained to convert audio data for a source speaker into audio data for a target speaker. The method comprises receiving: (i) source speech audio, and (ii) a target speaker identifier. The source speech audio comprises speech content in the voice of a source speaker. Source acoustic features are determined for the source speech audio. A target speaker embedding associated with the target speaker identifier is generated as output of a speaker encoder of the voice convertor. The target speaker embedding and the source acoustic features are inputted into an acoustic feature encoder of the voice convertor. One or more acoustic feature encodings are generated as output of the acoustic feature encoder. The one or more acoustic feature encodings are derived from the target speaker embedding and the source acoustic features. Target speech audio is generated for the target speaker. The target speech audio comprises the speech content in the voice of the target speaker. The generating comprises decoding the one or more acoustic feature encodings using an acoustic feature decoder of the voice convertor.

20 Claims, 9 Drawing Sheets

(51) Int. Cl.
  *A63F 13/424* (2014.01)
  *A63F 13/215* (2014.01)
  *G10L 15/00* (2013.01)

(56) References Cited

U.S. PATENT DOCUMENTS

| | | | | |
|---|---|---|---|---|
| 2019/0251952 | A1* | 8/2019 | Arik | G10L 13/027 |
| 2020/0335119 | A1* | 10/2020 | Xiao | G10L 21/0208 |
| 2020/0365166 | A1* | 11/2020 | Zhang | G10L 21/013 |
| 2020/0394998 | A1* | 12/2020 | Kim | G06N 3/08 |
| 2020/0411018 | A1* | 12/2020 | Chakravarty | G10L 19/02 |
| 2021/0056955 | A1* | 2/2021 | Doi | G10L 15/063 |
| 2021/0074308 | A1* | 3/2021 | Skordilis | G10L 19/13 |
| 2021/0090535 | A1* | 3/2021 | Miles | G10H 1/0008 |
| 2021/0193159 | A1* | 6/2021 | Pearson | G10L 21/0364 |
| 2021/0217431 | A1* | 7/2021 | Pearson | H04K 3/825 |
| 2021/0304783 | A1* | 9/2021 | Kons | G10L 17/06 |

OTHER PUBLICATIONS

Jia, YE, et al. "Transfer Learning from Speaker Verification to Multispeaker Text-to-Speech Synthesis." arXiv preprint arXiv:1806.04558 (2018), Retrieved from https://arxiv.org/abs/1806.04558.

Polyak, Adam, et al. "TTS skins: Speaker conversion via ASR." arXiv preprint arXiv:1904.08983 (2019), Retrieved from https://arxiv.org/abs/1904.08983.

Sun, Lifa, et al. "Voice conversion using deep bidirectional long short-term memory based recurrent neural networks." 2015 IEEE international conference on acoustics, speech and signal processing (ICASSP). IEEE, 2015. , Retrieved from: https://www.researchgate.net/profile/Lifa_Sun/publication/280919021_Voice_Conversion_Using_Deep_Bidirectional_Long_Short-Term_Memory_based_Recurrent_Neural_Networks/links/55cb072808aeca747d69fd26.pdf.

Kameoka, Hirokazu, et al. "StarGAN-VC: Non-parallel many-to-many voice conversion with star generative adversarial networks." arXiv preprint arXiv:1806.02169 (2018), Retrieved from https://arxiv.org/abs/1806.02169.

Liu, Li-Juan, et al. "WaveNet Vocoder with Limited Training Data for Voice Conversion." Interspeech. 2018, Retrieved from https://www.isca-speech.org/archive/Interspeech_2018/pdfs/1190.pdf.

Narayanan, Praveen, et al. "Hierarchical sequence to sequence voice conversion with limited data." arXiv preprint arXiv:1907.07769 (2019), Retrieved from https://arxiv.org/abs/1907.07769.

Zhang, Mingyang, et al. "Joint training framework for text-to-speech and voice conversion using multi-source tacotron and wavenet." arXiv preprint arXiv:1903.12389 (2019), Retrieved from https://arxiv.org/abs/1903.12389.

Huang, Wen-Chin, et al. "Voice transformer network: Sequence-to-sequence voice conversion using transformer with text-to-speech pretraining." arXiv preprint arXiv:1912.06813 (2019), Retrieved from https://arxiv.org/abs/1912.06813.

Luong, Hieu-Thi, and Junichi Yamagishi. "Bootstrapping non-parallel voice conversion from speaker-adaptive text-to-speech." arXiv preprint arXiv:1909.06532 (2019), Retrieved from https://arxiv.org/abs/1909.06532.

Kim, Tae-Ho, et al. "Emotional Voice Conversion using multitask learning with Text-to-speech." arXiv preprint arXiv:1911.06149 (2019), Retrieved from: https://arxiv.org/abs/1911.06149.

Ren, YI, et al. "FastSpeech 2: Fast and High-Quality End-to-End Text-to-Speech." arXiv preprint arXiv:2006.04558 (2020), Retrieved from: https://arxiv.org/abs/2006.04558.

Skerry-Ryan, R. J., et al. "Towards end-to-end prosody transfer for expressive speech synthesis with tacotron." arXiv preprint arXiv:1803.09047 (2018), Retrieved from: https://arxiv.org/abs/1803.09047.

Theune, Mariët, et al. "Generating expressive speech for storytelling applications." IEEE Transactions on Audio, Speech, and Language Processing 14.4 (2006): 1137-1144., Retrieved from: https://ieeexplore.ieee.org/abstract/document/1643643.

Gibiansky, Andrew, et al. "Deep voice 2: Multi-speaker neural text-to-speech." Advances in neural information processing systems. 2017, Retrieved from: http://papers.nips.cc/paper/6889-deep-voice-2-multi-speaker-neural-text-to-speech.

Shen, Jonathan, et al. "Natural tts synthesis by conditioning wavenet on mel spectrogram predictions." 2018 IEEE International Conference on Acoustics, Speech and Signal Processing (ICASSP). IEEE, 2018, Retrieved from: https://ieeexplore.ieee.org/abstract/document/8461368.

Wu, Xixin, et al. "Rapid Style Adaptation Using Residual Error Embedding for Expressive Speech Synthesis." Interspeech. 2018, Retrieved from: http://www1.se.cuhk.edu.hk/~hccl/publications/pub/2018_201809_INTERSPEECH_XixinWU.pdf.

Zen, Heiga, et al. "The HMM-based speech synthesis system (HTS) version 2.0." SSW. 2007, Retrieved from: http://citeseerx.ist.psu.edu/viewdoc/download?doi=10.1.1.69.5302&rep=rep1&type=pdf.

Kalchbrenner, Nal, et al. "Efficient Neural Audio Synthesis." International Conference on Machine Learning. 2018, Retrieved from: http://proceedings.mlr.press/v80/kalchbrenner18a.html.

Eyben, Florian, et al. "Unsupervised clustering of emotion and voice styles for expressive TTS." 2012 IEEE International Conference on Acoustics, Speech and Signal Processing (ICASSP). IEEE, 2012, Retrieved from: https://ieeexplore.ieee.org/abstract/document/6288797.

Wang, Yuxuan, et al. "Tacotron: Towards end-to-end speech synthesis." arXiv preprint arXiv:1703.10135 (2017), Retrieved from: https://arxiv.org/abs/1703.10135.

Wang, Yuxuan, et al. "Style Tokens: Unsupervised Style Modeling, Control and Transfer in End-to-End Speech Synthesis." ICML. 2018, Retrieved from: https://openreview.net/forum?id=Hy4s9o-OZr.

Akuzawa, Kei, Yusuke Iwasawa, and Yutaka Matsuo. "Expressive Speech Synthesis via Modeling Expressions with Variational Autoencoder." Proc. Interspeech 2018 (2018): 3067-3071, Retrieved from: https://www.isca-speech.org/archive/Interspeech_2018/abstracts/1113.html.

Taigman, Yaniv, et al. "VoiceLoop: Voice Fitting and Synthesis via a Phonological Loop." International Conference on Learning Representations. 2018, Retrieved from: https://openreview.net/forum?id=SkFAWax0-&noteId=SkFAWax0-.

Hsu, Wei-Ning, et al. "Hierarchical Generative Modeling for Controllable Speech Synthesis." International Conference on Learning Representations. 2018, Retrieved from: https://openreview.net/forum?id=rygkk305YQ.

Kenter, Tom, et al. "CHiVE: Varying prosody in speech synthesis with a linguistically driven dynamic hierarchical conditional variational network." International Conference on Machine Learning. 2019, Retrieved from: http://proceedings.mlr.press/v97/kenter19a.html.

Lee, Younggun, and Taesu Kim. "Robust and fine-grained prosody control of end-to-end speech synthesis." ICASSP 2019-2019 IEEE International Conference on Acoustics, Speech and Signal Processing (ICASSP). IEEE, 2019, Retrieved from: https://ieeexplore.ieee.org/abstract/document/8683501.

Klimkov, Viacheslav, et al. "Fine-Grained Robust Prosody Transfer for Single-Speaker Neural Text-to-Speech." Proc. Interspeech 2019 (2019): 4440-4444, Retrieved from: https://www.isca-speech.org/archive/Interspeech_2019/abstracts/2571.html.

Daniel, Povey, et al. "The Kaldi speech recognition toolkit." IEEE 2011 workshop on automatic speech recognition and understanding. No EPFL-CONF-192584. 2011, Retrieved from: https://www.fit.vut.cz/research/product/304/.

Ghahremani, Pegah, et al. "A pitch extraction algorithm tuned for automatic speech recognition." 2014 IEEE International conference on acoustics, speech and signal processing (ICASSP). IEEE, 2014, Retrieved from: https://eeexplore.ieee.org/abstract/document/6854049.

* cited by examiner

SPEAKER CONVERSION FOR VIDEO GAMES

BACKGROUND

In some modern video games, players are presented with the option to customize characters/entities in the video game, for example by selecting different voices in which a particular character can speak. To implement this, character utterances may be recorded in different voices. However, it may be difficult to ensure that recorded utterances in different voices align with pre-existing animation for a character.

SUMMARY

In accordance with a first aspect, this specification describes a computer-implemented method of generating speech audio for use in a video game, wherein the speech audio is generated using a voice convertor that has been trained to convert audio data for a source speaker into audio data for a target speaker. The method comprises receiving: (i) source speech audio, and (ii) a target speaker identifier. The source speech audio comprises speech content in the voice of a source speaker. Source acoustic features are determined for the source speech audio. A target speaker embedding associated with the target speaker identifier is generated as output of a speaker encoder of the voice convertor. The target speaker embedding and the source acoustic features are inputted into an acoustic feature encoder of the voice convertor. One or more acoustic feature encodings are generated as output of the acoustic feature encoder. The one or more acoustic feature encodings are derived from the target speaker embedding and the source acoustic features. Target speech audio is generated for the target speaker. The target speech audio comprises the speech content in the voice of the target speaker. The generating comprises decoding the one or more acoustic feature encodings using an acoustic feature decoder of the voice convertor.

In accordance with a second aspect, this specification describes a computer-implemented method of training a voice convertor, for use in a video game, to convert acoustic features for a source speaker into acoustic features for a target speaker. The method comprises receiving one or more training examples. Each training example comprises: (i) source acoustic features for speech content in the voice of the source speaker, and (ii) ground-truth target acoustic features for the speech content in the voice of the target speaker. For each training example of the one or more training examples, a target speaker embedding for the training example and the source acoustic features are inputted into an acoustic feature encoder of the voice convertor. One or more acoustic feature encodings are generated as output of the acoustic feature encoder. The one or more acoustic feature encodings are derived from the target speaker embedding and the source acoustic features. The one or more acoustic feature encodings are inputted into an acoustic feature decoder of the voice convertor. Predicted target acoustic features for the training example are generated as output of the acoustic feature decoder. Parameters of the acoustic feature encoder and the acoustic feature decoder are updated based on an objective function. The objective function comprises a comparison between the predicted target acoustic features and the ground-truth target acoustic features.

In accordance with a third aspect, this specification describes a computer-readable medium storing instructions, which when executed by a processor, cause the processor to: receive source speech audio, wherein the source speech audio comprises speech content in the voice of a source speaker; input a target speaker embedding for a target speaker and the source acoustic features into an acoustic feature encoder of a voice convertor; generate, as output of the acoustic feature encoder, one or more acoustic feature encodings derived from the target speaker embedding and the source acoustic features; and generate target speech audio for the target speaker, wherein the target speech audio comprises the speech content in the voice of the target speaker, the generating comprising decoding the one or more acoustic feature encodings using an acoustic feature decoder of the voice convertor.

BRIEF DESCRIPTION OF THE DRAWINGS

Certain embodiments of the present invention will now be described, by way of example, with reference to the following figures.

DETAILED DESCRIPTION

General Definitions

Figure 1:
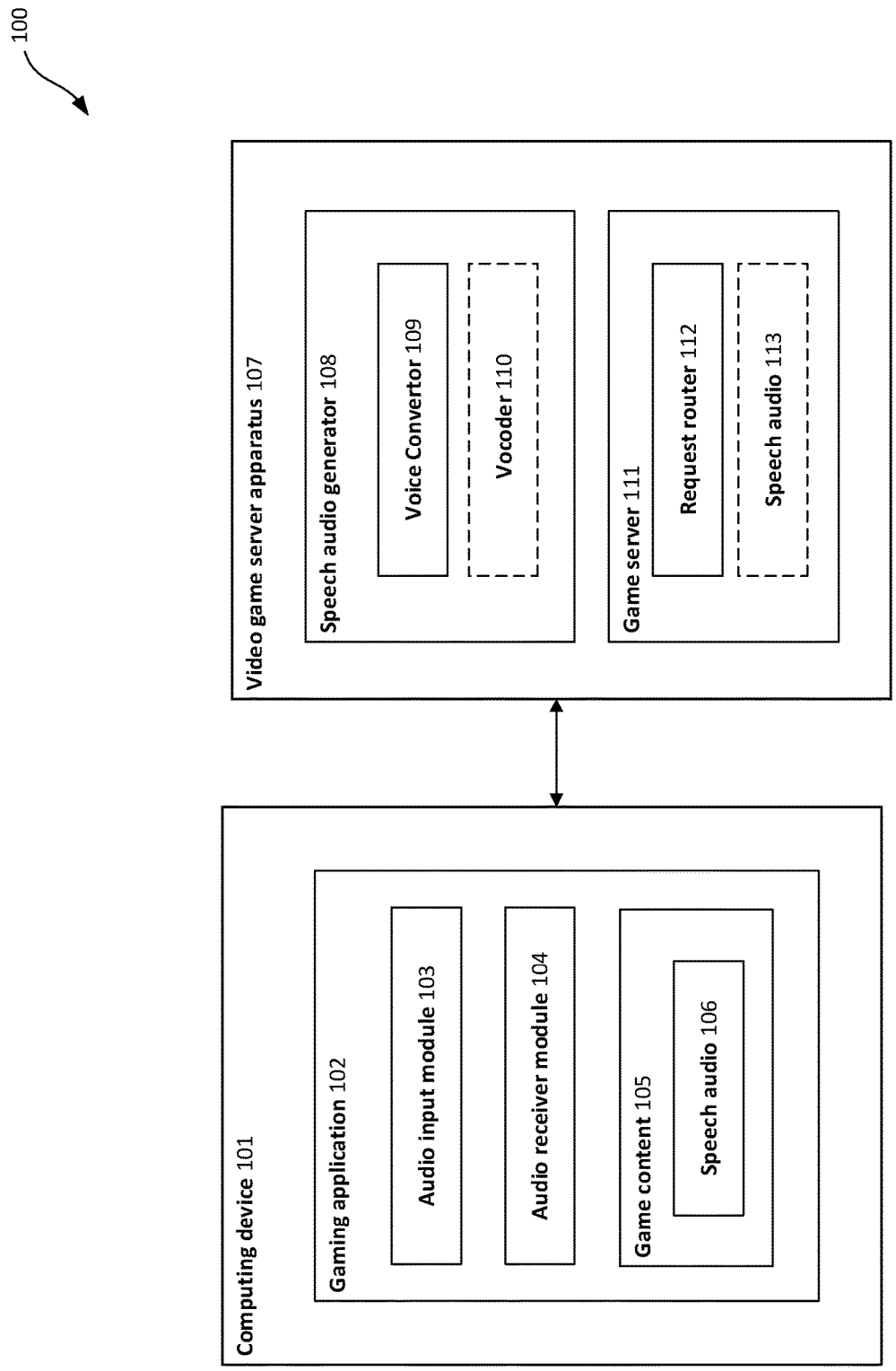
FIG. 1 is a schematic block diagram illustrating an example of a computer system configured to provide a video game environment to players of a video game.

The following terms are defined to aid the present disclosure and not limit the scope thereof.

A "user" or "player", as used in some embodiments herein, refers to an individual and/or the computing system(s) or device(s) corresponding to (e.g., associated with, operated by) that individual.

A "client" as used in some embodiments described herein, is a software application with which a user interacts, and which can be executed on a computing system or device locally, remotely, or over a cloud service.

A "server" as used in some embodiments described here, is a software application configured to provide certain services to a client, e.g. content and/or functionality.

A "video game" as used in some embodiments described herein, is a virtual interactive environment in which players engage. Video game environments may be facilitated through a client-server framework in which a client may connect with the server to access at least some of the content and functionality of the video game.

"Speech" as used in some embodiments described herein may include sounds in the form of spoken words in any language, whether real or invented and/or other utterances including paralinguistics such as sighs, yawns, moans etc. "Speech audio" refers to audio (e.g. audio data) which includes or represents speech, and may comprise data in any suitable audio file format whether in a compressed or uncompressed format.

"Acoustic features" as used in some embodiments described herein may include any suitable acoustic representation of frequency, magnitude and/or phase information. For example, acoustic features may comprise linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof.

Example implementations provide systems and methods for generating speech audio in a video game, using a voice convertor to generate audio data for a target speaker. Specifically, the voice convertor is configured to convert acoustic features relating to a source speaker into audio data (e.g. acoustic features, speech audio) for the target speaker.

The described systems and methods are particularly advantageous for use in the context of video games (e.g. in video game development, or after deployment of a video game). In video games, it may be desirable to align speech audio with the animation of a particular character or scene in the game. In video games that allow players to select different voices for characters, it may be useful to ensure that the timing of recorded speech audio for different voices closely match each other, and also match the animation of the character or scene.

The methods and systems described in this specification enable speech audio to be generated in a target speaker's voice, while maintaining the performance (e.g. speech prosody) and timing of source speech audio from which the acoustic features relating to a source speaker are derived. This may be achieved by, for example, learning suitable speaker embeddings and using these learned speaker embeddings when converting voices. Suitable speaker embeddings may accurately reflect characteristics of a speaker's voice and disentangle these voice characteristics from other aspects of speech audio (such as speech prosody). In some embodiments, a speaker embedding may be generated using a trained speaker encoder, as described in more detail below. Alternatively, or in addition, new voices may be created by combining previously determined speaker embeddings (for example by summing two or more embeddings together) and/or by varying known embeddings, so as to generate new embeddings with different voice characteristics (e.g. different gender, age etc). In this way, a "space" of voices may be created which an operator may explore until they find an embedding corresponding to a desired voice for the target speaker. In such embodiments, a target speaker embedding may thus be determined without the use of a trained speaker encoder and the speaker encoder may be omitted from the voice convertor during inference.

Timing information of source speech audio may be maintained through use of an attention mechanism in the voice convertor. The attention mechanism may be trained to utilize appropriate segments/frames of an encoding of source acoustic features when generating target acoustic features. Furthermore, the systems and methods described herein can accommodate for differences in the length of a target speaker's waveform compared to the source speaker's waveform due to the use of sequence-to-sequence and encoder-decoder architectures as described below.

The methods and systems described herein allow voice conversion to (or voice cloning of) a target voice using a small amount of speech audio data for the target speaker relative to other techniques which do not use a voice convertor as described herein. However, in some embodiments, additional speech audio data for the target speaker may be leveraged (e.g. as additional training data) in order to provide improved quality output. In some examples, a pre-trained speaker encoder may be provided to generate speaker embeddings as described below. While in some examples, the speaker encoder may be retrained or finetuned using audio samples from the target speaker, in some examples the speaker encoder may be entirely pretrained, using speech audio samples provided by other speakers. Training using more speech samples provided by different speakers may allow for better quality (e.g. more realistic) speech audio to be output. For example, a more representative speaker encoder that outputs more suitable speaker embeddings (e.g. that more accurately reflects characteristics of a speaker's voice) may be learned as a result of training with more speech samples. A target speaker embedding learned in this way may be used to realistically convert the voice of source speech audio into the voice of the target speaker. In some embodiments, the target speaker may be the player of a video game. This is, methods and system described in this specification enable speech audio to be generated in the voice of a player of a video game, using speech audio provided by the player (e.g. a small amount of speech audio such as minutes of speech audio from the player), and the voice convertor.

Example Video Game Environment

FIG. 1 illustrates an example of a computer system configured to provide a video game environment 100 to players of a video game.

The video game environment 100 includes video game server apparatus 107, and one or more client computing devices 101. Each client computing device 101 is operable by a user and provides a client in the form of gaming application 102 to the user. The client computing device 101 is configured to communicate with the video game server apparatus 107 which provides a game server 111 for providing content and functionality to the gaming application 102. For the sake of clarity, the video game environment 100 is illustrated as comprising a specific number of devices. Any of the functionality described as being performed by a specific device may instead be performed across a number of computing devices, and/or functionality described as being performed by multiple devices may be performed on a single device. For example, multiple instances of the video game server apparatus 107 (or components thereof) may be hosted as virtual machines or containers on one or more computing devices of a public or private cloud computing environment.

The video game server apparatus 107 provides speech audio generator 108. The speech audio generator 108 receives source speech audio comprising speech content (e.g. pre-recorded speech audio), and a target speaker identifier for a target speaker, and outputs speech audio in the target speaker's voice corresponding to the speech content. The source speech audio may be pre-recorded speech audio and may derived from game content 105, such as from speech audio 106 stored on the client computing device 101, or speech audio 113 stored on the server apparatus 107. The speaker identifier is any data that can be associated with (e.g.

used to identify) an individual speaker. In some embodiments, the speaker identifier is a different one-hot vector for each speaker whose voice can be synthesized in output of the speech audio generator 108. In other embodiments, speech samples (or indications thereof, e.g. acoustic features) provided by that particular speaker are used as a speaker identifier. The target speaker may be a user of the computing device 101, such as a player of the video game, or any other speaker whose voice samples were used to train the speech audio generator 108. Other inputs, such as animation information, linguistic information, timing information, and speaker attributes (such as gender and/or age of the speaker) may also be provided as input to the speech audio generator 108.

The client computing device 101 can be any computing device suitable for providing the gaming application 102 to the user. For example, the client computing device 101 may be any of a laptop computer, a desktop computer, a tablet computer, a video games console, or a smartphone. For displaying the graphical user interfaces of computer programs to the user, the client computing device includes or is connected to a display (not shown). Input device(s) (not shown) are also included or connected to the client. Examples of suitable input devices include keyboards, touchscreens, mice, video game controllers, microphones and cameras.

Gaming application 102 provides a video game to the user of the client computing device 101. The gaming application 102 may be configured to cause the client computing device 101 to request video game content from the video game server apparatus 107 while the user is playing the video game. Requests made by the gaming application 102 are received at the request router 112 of game server 111, which processes the request, and returns a corresponding response (e.g. synthesized speech audio generated by the speech audio generator 108) to gaming application 102. Examples of requests include Application Programming Interface (API) requests, e.g. a representational state transfer (REST) call, a Simple Object Access Protocol (SOAP) call, a message queue; or any other suitable request.

The gaming application 102 provides an audio input module 103 for use by the user of computing device 101. The audio input module 103 is configured to enable a player of the video game to input player speech samples for use in refining the voice convertor 109 (or components thereof) of speech audio generator 108. The audio input module 103 transmits player speech audio to the request router 112, which is subsequently transmitted to the speech audio generator 108. The player speech audio may be any suitable digital data and may for example represent a waveform of the player speech samples (e.g. transmitted as an MP3 file, a WAV file, etc). The player speech audio may comprise acoustic features of the player speech sample. Acoustic features may comprise any low-level acoustic representation of frequency, magnitude and phase information such as linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof. The acoustic features may comprise a sequence of vectors, each vector representing acoustic information in a short time period, e.g. 50 milliseconds.

The gaming application 102 provides an audio receiver module 104 configured to receive output of the speech audio generator 108. The audio receiver module 104 may be configured to request speech audio from the speech audio generator 108 throughout different stages of the video game. For example, some of the speech content may be predetermined (e.g. stored in game content 105, and/or at game server 111) and so the audio receiver module 104 may request synthesized speech audio for the predetermined content at the same time, e.g. during a loading process. The speech audio may be received at the audio receiver module 104 as a waveform (e.g. represented in an MP4 file, a WAV file, etc).

The gaming application 102 comprises game content 105 accessed while the video game is being played by the player. The game content 105 includes speech audio 106, and other assets such as speech scripts, markup-language files, scripts, images and music. The speech audio 106 comprises audio data for entities/characters in the video game, which may be output by the gaming application 102 at appropriate stages of the video game. The speech audio 106 (or a portion thereof) may have corresponding speech scripts which are transcriptions of the speech audio 106.

The speech audio 106 (and, potentially, speech scripts/transcriptions thereof) are also used if a player of the video game decides to add their voice to speech audio generator 108. During an initialization process, the player is provided with examples of speech audio 106 and is asked to provide player speech samples corresponding to the speech audio 106, which samples are used to refine (i.e. further train) the voice convertor 109 (or components thereof). For example, the user may be asked to mimic an example of speech audio 106 such that the player provides the same speech content as the example, in a speech style (e.g. prosody) similar to that of the example. Additionally or alternatively, a transcript may be provided for the user to recite. The resulting player speech sample may be associated with the example of speech audio 106 as a "paired" training example for use in refining the voice convertor 109 (or components thereof), as will be described in relation to FIGS. 5 and 6. In some implementations, speech audio 113 and/or speech scripts may also be stored at game server 111.

As will be described in further detail in relation to FIG. 2, the speech audio generator 108 comprises a voice convertor 109, and optionally, a vocoder 110. The speech audio generator 108 receives source speech audio comprising speech content and determines source acoustic features thereof. The source speech audio comprises a waveform of speech audio. The source acoustic features are transformed, in accordance with a target speaker identifier, by the voice convertor 109 into audio data relating to the speech content in the voice of the target speaker. For example, the audio data may comprise target acoustic features. Speech audio in the target speaker's voice (otherwise referred to as target speech audio herein) may be output by the vocoder 110 after processing the target acoustic features. Alternatively, the audio data generated by the voice convertor 109 may comprise speech audio for the speech content in the target speaker's voice. The target speech audio comprises a waveform of speech audio.

The video game server apparatus 107 provides the game server 111, which communicates with the client-side gaming application 102. As shown in FIG. 1, the game server 111 includes request router 112, and optionally, speech audio 113 as described previously. The request router 112 receives requests from the gaming application 102, and provides video game content responsive to the request to the gaming application 102. Examples of requests include Application Programming Interface (API) requests, e.g. a representational state transfer (REST) call, a Simple Object Access Protocol (SOAP) call, a message queue; or any other suitable request.

Although FIG. 1 shows the speech audio generator 108 implemented by video game server apparatus 107, it will be appreciated that one or more components of the speech audio generator 108 may be implemented by computing device 101. For example, one or more components of the voice convertor 109 may be implemented by computing device 101, avoiding the need for player speech samples to be transmitted to video game server apparatus 107.

Example Speech Audio Generator Method

Figure 2:
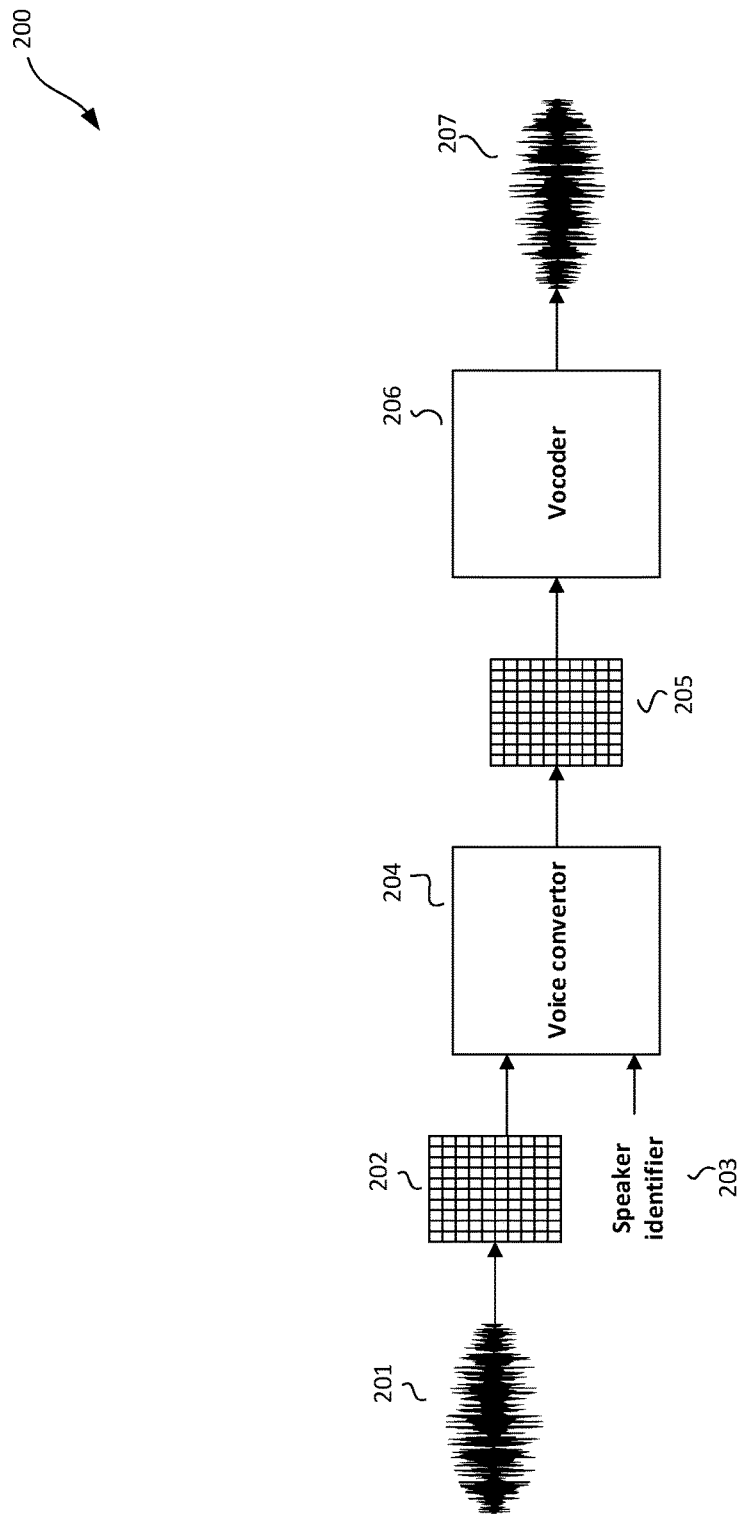
FIG. 2 illustrates an example method for generating speech audio in a voice of a target speaker using a voice convertor.

FIG. 2 illustrates an example method for a speech audio generator 200 for generating speech audio in a voice of a target speaker, using a voice convertor.

The speech audio generator 200 comprises a voice convertor 204 used to transform source acoustic features into target acoustic features. As will be described in relation to FIGS. 4-6, the voice convertor 204 comprises machine-learned models that may be initially trained using recordings or input from speakers for whom there are many speech samples. If a new speaker is added to voice convertor 204 (e.g. a player of the video game), the voice convertor 204 may be refined/further trained using a few speech samples provided by the new speaker. In this way, target acoustic features corresponding to the speech content in the new speaker's voice can be generated.

The speech audio generator 200 is configured to receive source speech audio 201. The source speech audio 201 comprises speech content in the voice of a source speaker and may comprise pre-recorded speech audio. The speech content of the source speech audio 201 may include (or be) lexical utterances such as words, non-lexical utterances, or a combination of lexical and non-lexical utterances. Non-lexical utterances may include noises (e.g. a sigh or moan), disfluencies (e.g. um, oh, uk), and the like. Any paralinguistic utterance may form part of the speech content, such as sighs, yawns, moans, laughs, grunts, etc. The source speech audio 201 may be any suitable digital data and may for example represent a waveform of speech audio (e.g. transmitted as an MP3 file, a WAV file, etc). The source speaker may be a speaker whose voice samples were used to initially train voice convertor 204.

The source speech audio 201 may be pre-processed before being processed by the speech audio generator 200. Pre-processing steps may include denoising, silence removal, compression, and/or downsampling.

The source speech audio 201 is processed by the speech audio generator 200, and source acoustic features 202 of the source speech audio 201 are determined. The source acoustic features 202 may comprise any low-level acoustic representation of frequency, magnitude and phase information such as linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof. The source acoustic features 202 may comprise a sequence of vectors, each vector representing acoustic information in a short time period, e.g. 50 milliseconds. Source acoustic features 202 may be determined in any suitable manner, e.g. by performing a Fast Fourier Transform on source speech audio 201.

The voice convertor 204 is configured to receive the source acoustic features 202 and a speaker identifier 203. The speaker identifier 203 is any data that can be associated with (e.g. used to identify) an individual speaker. In some embodiments, the speaker identifier 203 is a different one-hot vector for each speaker whose voice can be synthesized in output of the speech audio generator 200. In other embodiments, speech samples (or acoustic features thereof) provided by that particular speaker are used as a speaker identifier 203. The source acoustic features 202 and speaker identifier 203 are processed by the voice convertor module 204 to output target acoustic features 205. The target acoustic features 205 comprise acoustic features for the speech content of source speech audio 201, but in a voice of the target speaker associated with speaker identifier 203. The target speaker may be a player of the video game, or any other speaker whose voice samples were used to train the voice convertor 204.

The vocoder 206 is configured to receive the target acoustic features 205. The vocoder 206 processes the target acoustic features to produce a waveform of speech audio 207. The speech audio 207 is synthesized speech audio in the target speaker's voice corresponding to the speech content of source speech audio 201. The speech audio 207 comprises an amplitude sample for each of a plurality of audio frames.

The vocoder 206 may be pre-trained using recordings or input from speakers for whom there are many speech samples. In some cases, the same vocoder 206 may be used for many speakers without the need for retraining based on new speakers, i.e. the vocoder 206 may comprise a universal vocoder. For example, the vocoder 206 may be pre-trained using training examples derived from speech samples wherein each training example comprises acoustic features for the speech sample and a corresponding ground-truth waveform of speech audio. The vocoder 206 processes the acoustic features of one or more training examples and generates a predicted waveform of speech audio for the one or more training examples. The vocoder 206 is trained in dependence on an objective function, wherein the objective function comprises a comparison between the predicted waveform of speech audio and the ground-truth waveform of speech audio. The parameters of the vocoder 206 are updated by optimizing the objective function using any suitable optimization procedure. For example, the objective function may be optimized using gradient-based methods such as stochastic gradient descent, mini-batch gradient descent, or batch gradient descent.

Although FIG. 2 depicts a vocoder 206 generating speech audio, it will be appreciated that the vocoder 206 may be omitted from the speech audio generator 200 (as described in relation to FIG. 1), and that the voice convertor 204 may be configured to output the speech audio 207 for the target speaker (in addition to, or in lieu of, the target acoustic features 205).

The speech audio 207 may be post-processed. Post-processing steps may include denoising, upsampling, and/or decompression to a full sample rate.

Example Voice Convertor Method

Figure 3:
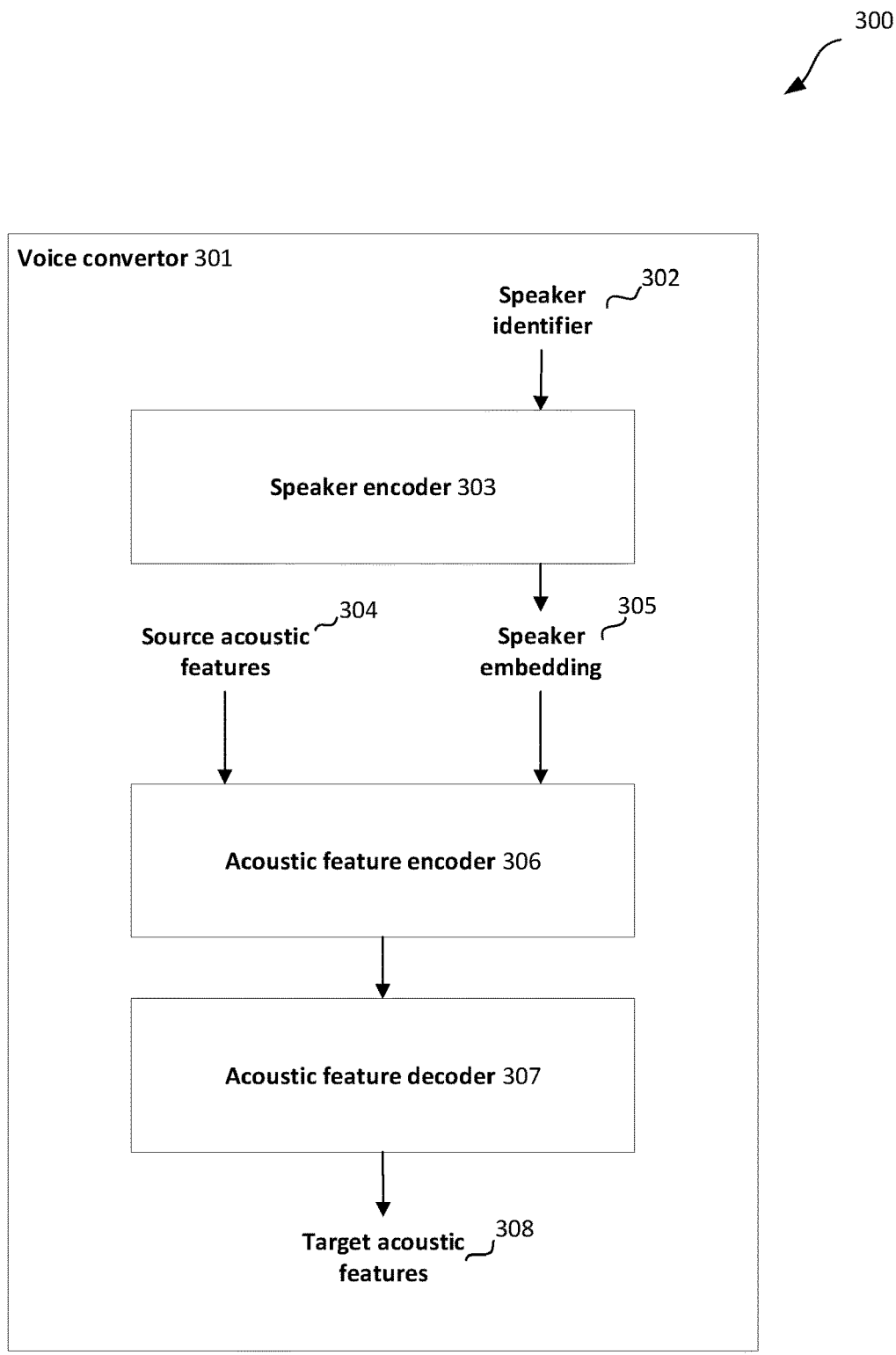
FIG. 3 illustrates an example method for transforming source acoustic features into target acoustic features.

FIG. 3 illustrates an example method 300 for a voice convertor configured to transform source acoustic features into target acoustic features.

The voice convertor 301 comprises a speaker encoder 303, an acoustic feature encoder 306, and an acoustic feature decoder 307.

The speaker encoder 303 is configured to receive a speaker identifier 302. The speaker identifier 302 is any data that can be associated with (e.g. used to identify) an individual speaker. In some embodiments, the speaker identifier 302 is a different one-hot vector for each speaker whose voice can be synthesized in output of the speech audio generator. In other embodiments, speech samples (or indications thereof, e.g. acoustic features) provided by that particular speaker may be used as a speaker identifier 302.

The speaker encoder 303 processes the speaker identifier 302 and outputs speaker embedding 305. The speaker embedding 305 is a representation of the voice of the speaker associated with speaker identifier 302. The speaker embedding 305 is a vector of a learned embedding space, such that different speakers are represented in different regions of the embedding space. In embodiments where the speaker identifier 302 comprises speech samples (or acoustic features thereof) from the speaker, the speaker embedding 305 may be determined from an average of one or more embeddings which each may be determined by inputting a different speech sample (or acoustic features thereof) from the speaker into speaker encoder 303. New voices may be created by combining (or otherwise varying) learned speaker embeddings, and inputting these modified speaker embeddings into the acoustic feature encoder 306. For example, a modified speaker embedding may be generated by adding together the speaker embeddings of two or more different speakers.

In some embodiments, and as will be described in relation to FIG. 4, the speaker encoder 303 has been trained separately to acoustic feature encoder 306 and acoustic feature decoder 307. In these embodiments, the speaker encoder 303 may comprise a recurrent neural network comprising one or more recurrent layers. The recurrent neural network is configured to receive a speaker identifier comprising speech audio (or acoustic features thereof) from a particular speaker.

In a recurrent neural network, each recurrent layer comprises a hidden state that is updated as the recurrent neural network processes data input to the network. For each time step, recurrent layer receives its hidden state from the previous time step, and an input to the recurrent layer for the current time step. A recurrent layer processes its previous hidden state and the current input in accordance with its parameters and generates an updated hidden state for the current time step. For example, recurrent layer may apply a first linear transformation to the previous hidden state and a second linear transformation to the current input and combine the results of the two linear transformations e.g. by adding the two results together. Recurrent layer may apply a non-linear activation function (e.g. a tanh activation function, a sigmoid activation function, a ReLU activation function, etc.) to generate an updated hidden state for the current time step.

In some embodiments, and as will be described in relation to FIG. 6, the speaker encoder 303 has been trained jointly with acoustic feature encoder 306 and acoustic feature decoder 307. In these embodiments, the speaker encoder 303 may comprise a feedforward neural network comprising one or more fully connected layers. The feedforward neural network is configured to receive a speaker identifier for a particular speaker, for example a one-hot vector indicating the particular speaker.

A fully connected layer receives an input and applies a learned linear transformation to its input. The fully connected layer may further apply a non-linear transformation to generate an output for the layer.

Acoustic feature encoder 306 is configured to receive source acoustic features 304 and target speaker embedding 305. The acoustic feature encoder outputs one or more acoustic feature encodings. An acoustic feature encoding may be determined for each input time step of a plurality of input time steps of the source acoustic features. The acoustic feature encoding for each input time step may comprise a combination of the speaker embedding for the speaker and an encoding of the source acoustic features for the input time step. For example, the combination may be performed by a concatenation operation, an addition operation, a dot product operation, etc. The acoustic feature encoder 306 may comprise a recurrent neural network comprising one or more recurrent layers.

Acoustic feature decoder 307 is configured to receive the one or more acoustic feature encodings output by acoustic feature encoder 306. The acoustic feature decoder 307 outputs target acoustic features 308. The target acoustic features 308 comprises target acoustic features for a plurality of output time steps. The acoustic feature decoder 307 may comprise an attention mechanism. For each output time step of the plurality of output time steps, the acoustic feature encoding for each input time step may be received. The attention mechanism may generate an attention weight for each acoustic feature encoding. The attention mechanism may generate a context vector for the output time step by averaging each acoustic feature encoding using the respective attention weight. The acoustic feature decoder 307 may process the context vector of the output time step to generate target acoustic features for the output time step. The acoustic feature decoder 307 may comprise a recurrent neural network comprising one or more recurrent layers.

Although depicted in FIG. 3 as two separate components, it will be appreciated that the acoustic feature encoder 306 and acoustic feature decoder 307 may be combined as a single encoder-decoder model. For example, they may be combined as an encoder-decoder (e.g. sequence-to-sequence) neural network with or without attention.

A model trainer may be used, after an initial training procedure for the components of the voice convertor 301, to refine components of the voice convertor 301 when adding a new speaker's voice (e.g. a player's voice) to the speech audio generator. During the process of adding the new speaker's voice to the speech audio generator, the new speaker provides speech samples from which acoustic features are determined to refine (i.e. further train) the acoustic feature encoder 306, and acoustic feature decoder 307. In some implementations, the speaker encoder 303 is also refined using the speech samples provided by the new speaker.

The speech samples may be used to form a "paired training example" or an "unpaired training example". In a "paired training example", the speech sample provided by the new speaker closely matches an example used to train components of the voice convertor 301. For example, a player may be asked to mimic an example of speech audio such that the player speaks the same words as the example, in a speech style (e.g. prosody) and with timing similar to that of the example. It should be noted that the systems and methods described herein can accommodate for differences in the length of the target speaker's waveform compared to the source speaker's waveform due to the use of sequence-to-sequence and encoder-decoder architecture as described above. In some embodiments, and as will be described in relation to FIG. 6, paired training examples may be used to jointly train speaker encoder 303, acoustic feature encoder 306, and acoustic feature decoder 307. In an "unpaired training example", the speech sample provided by the new speaker does not closely match an example used to train components of the voice convertor module 301. In some embodiments, and as will be described in relation to FIG. 4, unpaired training examples may be used to separately train speaker encoder 303.

Example Speaker Encoder Training Method

Figure 4:
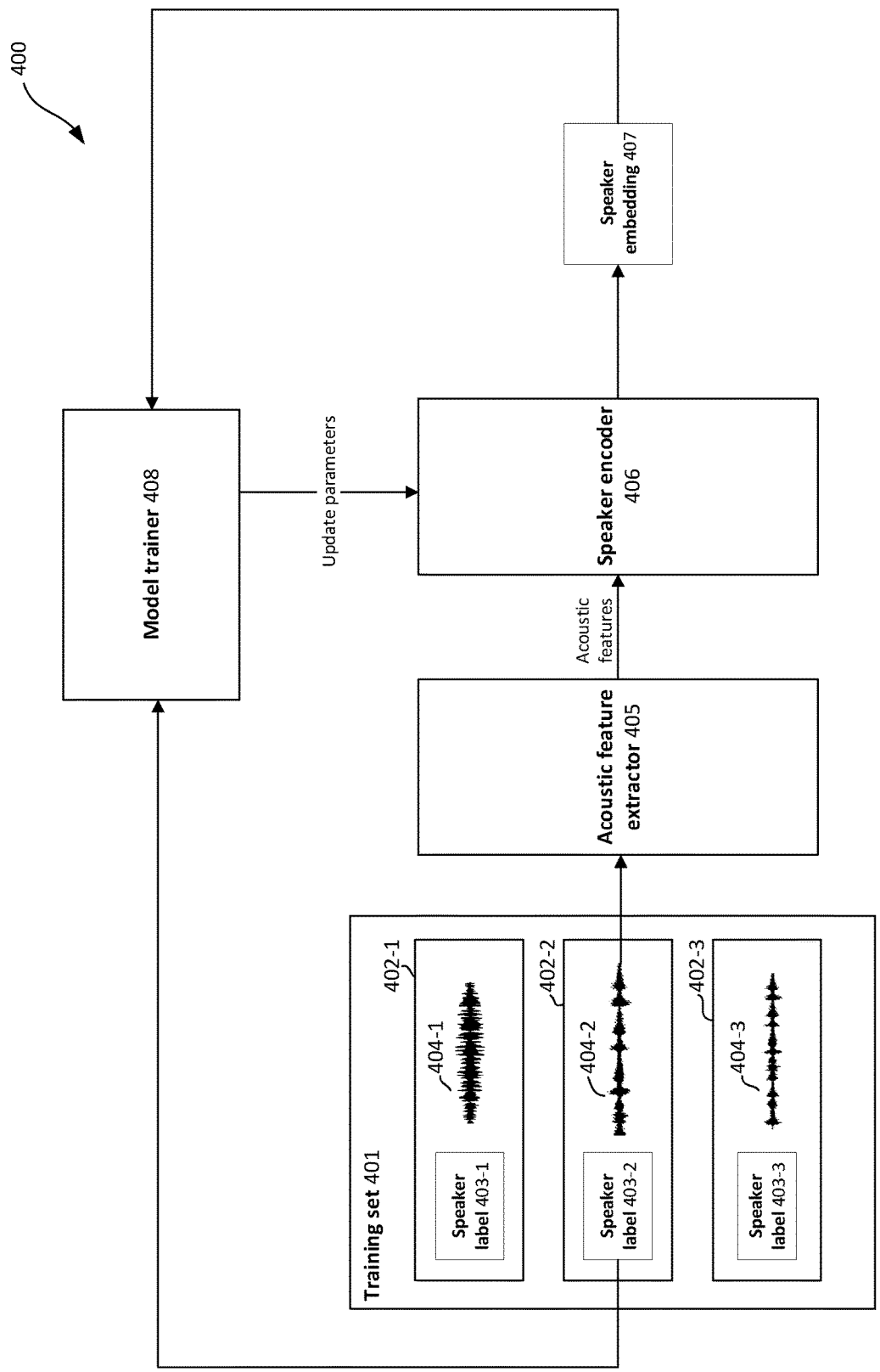
FIG. 4 is illustrates an example method for training a speaker encoder to generate speaker embeddings.

FIG. 4 is illustrates an example method 400 for training a speaker encoder to generate speaker embeddings. In the embodiment depicted in FIG. 4, the speaker encoder 406 is trained separately to the acoustic feature encoder and acoustic feature decoder. The separate training of the acoustic feature encoder and acoustic feature decoder will be described in relation to FIG. 5.

As shown in FIG. 4, the speaker encoder is being trained on a speaker verification task, although it will be appreciated that the speaker encoder may be trained on other similar tasks (such as speaker classification). In the speaker verification task, speech audio (or acoustic features thereof) is processed in order to verify the speaker's identity. Separate training of the speaker encoder 406 may result in a more representative speaker encoder, such that speaker embeddings 407 output by the speaker encoder 406 more accurately reflect the characteristics of a speaker's voice. For example, speech samples spoken by the same speaker may have different embeddings, which are close to each other (in an embedding space) compared to embeddings for speech samples from different speakers. In cases where the performance of the speaker is different in speech samples provided by that speaker (for example whispering compared to screaming), the variety in performance may be captured in the embeddings since a different embedding is output for each speech sample. In addition, speaker encoder 406 may have sufficient representation power to encode speech audio from speakers that are not present in the training set used to train the speaker encoder 406. Given a new speaker, the speaker encoder 406 may not need to be retrained and can be used as preprocessing module to obtain speaker embeddings. Furthermore, unpaired training examples may be used to train speaker encoder 406, allowing a large corpus of publicly available data to be used to train the speaker encoder 406.

The speaker encoder 406 is trained using training set 401 comprising training examples 402-1, 402-2, 402-3. Each training example 402 comprises speech audio 404 and a speaker label 403 corresponding to the speaker identity of the respective speech audio 404. For example, if speech audio 404-1 and speech audio 404-2 were provided by the same speaker, then speaker labels 403-1 and 403-2 are identical. Speaker label 403-3 is different to that of speaker labels 403-1, 403-2 if speech audio 404-3 was provided by a different speaker to that of speech audio 404-1, 404-2. Speaker labels 403 may be represented by one hot vectors such that a different one-hot vector indicates each speaker in the training set 401. In general, the training set 401 comprises a plurality of examples of speech audio 404 for each speaker.

As shown in FIG. 4, speech audio 404-2 of training example 402-2 is processed by acoustic feature extractor 405 to determine acoustic features for speech audio 404-2. Acoustic feature extractor 405 may determine acoustic features in any suitable manner, e.g. by performing a Fast Fourier Transform on speech audio 404. Acoustic features determined by the acoustic feature extractor 405 may comprise any low-level acoustic representation of frequency, magnitude and phase information such as linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof. The acoustic features may comprise a sequence of vectors, each vector representing acoustic information in a short time period, e.g. 50 milliseconds.

The acoustic features are received by speaker encoder 406, which processes the acoustic features in accordance with a current set of parameters and outputs a speaker embedding 407 for speech audio 404-2.

The speaker embedding 407 is processed in order to verify the speaker identity of speech audio 404-2. For example, the speaker embedding 407 may be used as part of a speaker verification loss comprising a generalized end-to-end speaker loss, with the speaker encoder 406 trained to optimize the loss. The generalized end-to-end speaker loss may be used to train the speaker encoder 406 to output embeddings of utterances from the same speaker with a high similarity (which may be measured by cosine similarity), while those of utterances from different speakers are far apart in the embedding space. For example, the generalized end-to-end speaker loss may involve finding a centroid for each speaker by averaging embeddings for speech samples provided by the speaker. A similarity matrix may be determined measuring the similarity (e.g. cosine similarity, or a linear transformation thereof) between the embedding for each utterance in a training batch and the centroid for each speaker. The generalized end-to-end speaker loss may encourage the similarity matrix to have high values for matching speaker-centroid values (e.g. values representing a similarity between an embedding for an utterance by a speaker and the centroid for the same speaker), and low values for non-matching speaker-centroid values. Alternatively, the speaker embedding for speech audio 404-2 may be received by an output classification layer which processes the speaker embedding in accordance with a current set of parameters, and outputs a speaker identity output. For example, the output classification layer may comprise a softmax layer, and the speaker identity output may comprise a probability vector indicating a probability, for each speaker out of the set of speakers included in the training set 401, that speech audio 404-2 was provided by the speaker.

Model trainer 408 receives speaker embedding 407 for speech audio 404-2, and speaker label 403-2 for speech audio 404-2 and updates the parameters of speaker encoder 406 in order to optimize an objective function. The objective function comprises a loss in dependence on the speaker label 403-2 and speaker embedding 407. For example, the loss may be a speaker verification loss. Additionally or alternatively, the loss may measure a cross-entropy loss between speaker label 403-2 and a speaker identity output. The objective function may additionally comprise a regularization term, for example the objective function may be a linear combination of the loss and the regularization term. The parameters of the speaker encoder 406 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad. In the event that an output classification layer is included, optimizing the objective function using the model trainer 408 may include updating the parameters of the output classification layer.

Although FIG. 4 shows the training process with processing of a single training example, it will be appreciated that any number of training examples may be used when updating the parameters of the speaker encoder 406. The training process is repeated for a number of passes through the training set 401, and is terminated at a suitable point in time, e.g. when a speaker identity output derived from speaker embedding 407 can be reliably used to correctly verify speaker identity. After training has completed, the speaker encoder 406 is retained for use in generating speaker embeddings for speech samples, as described previously. Although the speaker encoder may in some cases be subsequently finetuned by way of further training using speech audio data for new voices, this may not be necessary if the speaker encoder is pretrained using a sufficient number of speakers. This may be achieved as the speaker encoder may not need paired training data and may be pretrained using data from many voices.

Example Acoustic Feature Encoder/Decoder Training Method

Figure 5:
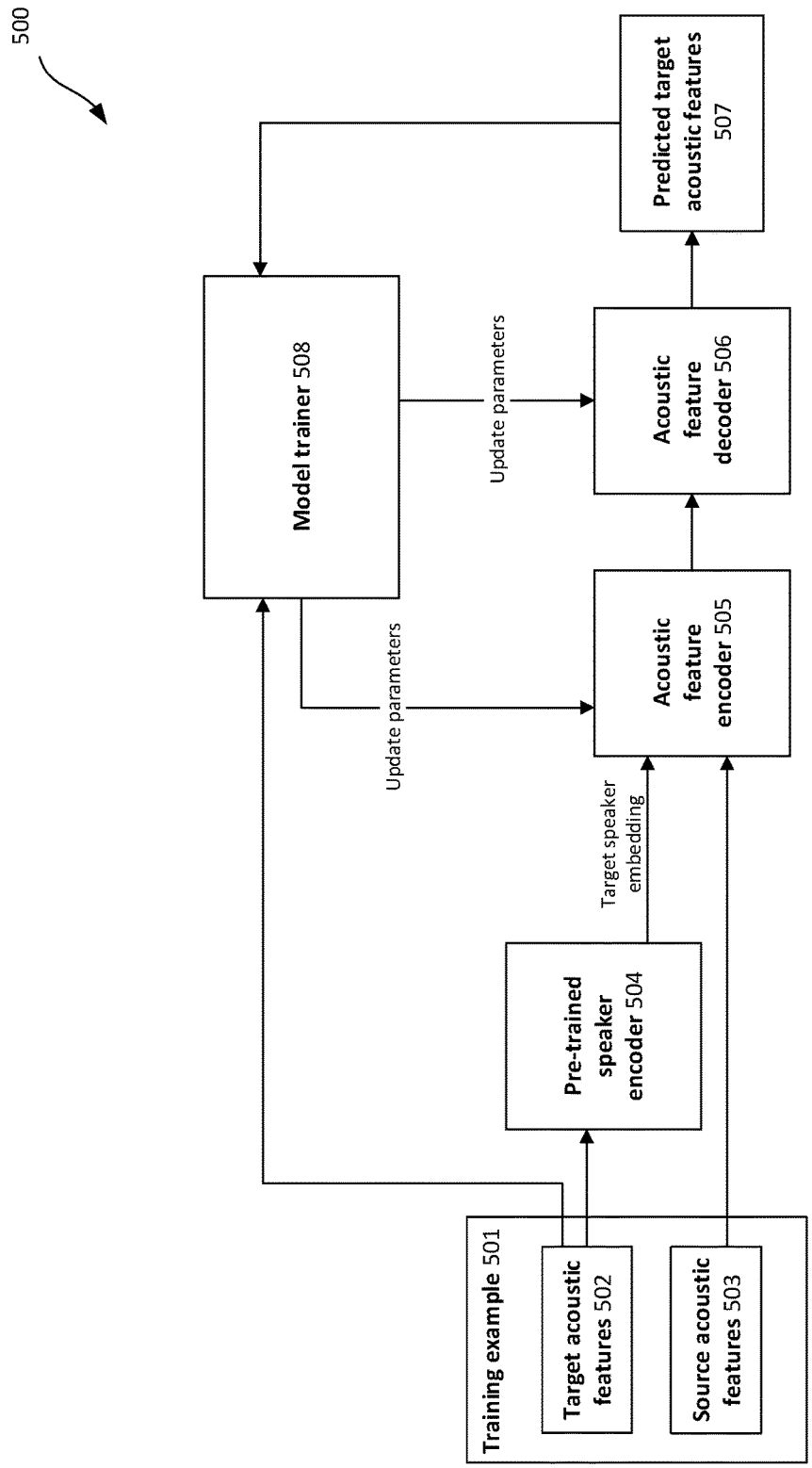
FIG. 5 illustrates an example method for training an acoustic feature encoder and an acoustic feature decoder to generate target acoustic features.

FIG. 5 illustrates an example method 500 for training an acoustic feature encoder and an acoustic feature decoder to generate target acoustic features. The method displayed in FIG. 5 occurs after separate training of the speaker encoder, resulting in a pre-trained speaker encoder 504, as described in relation to FIG. 4. During the training process displayed in FIG. 5, the parameters of the pre-trained speaker encoder 504 are fixed. The acoustic feature encoder 505 and acoustic feature decoder 506 are initially trained prior to adding a new speaker's voice (e.g. a player's voice) and are subsequently refined when the new speaker adds their voice and provides speech samples.

As shown in FIG. 5, acoustic feature encoder 505 and acoustic feature decoder 506 are trained on a voice conversion task using one or more training examples 501. In a voice conversion task, source acoustic features are transformed into target acoustic features such that synthesized speech audio from the target acoustic features closely match the content, performance, and timing of the source acoustic features, while changing the voice represented in the source acoustic features into that of the target speaker.

Training example 501 comprises source acoustic features 503 and corresponding target acoustic features 502. During training, the goal of the acoustic feature encoder 505 and the acoustic feature decoder 506 is to transform source acoustic features 503 of a training example 501 into the target acoustic features 502 of the training example 501. The training example may be referred to as a "paired" training example, wherein the source speech audio (from which the source acoustic features 503 are determined) and the target speech audio (from which the target source acoustic features 502 are determined) differ only in speaker identity. Alternatively said, the content (e.g. the words spoken), the performance, and the timing of the source and target speech audio may closely match each other in a paired training example.

When adding a new player's voice, the target acoustic features 502 correspond to acoustic features from player speech samples provided by the player. As described previously, the player speech samples may be paired with source speech audio (e.g. when the player is asked to mimic the source speech audio).

The target acoustic features 502 are received by the pre-trained speaker encoder, which processes the target acoustic features 502 in accordance with a learned set of parameters, and outputs a target speaker embedding for the target acoustic features 502.

The target speaker embedding and source acoustic features 503 are received by acoustic feature encoder 505, which processes the received inputs in accordance with a current set of parameters to output one or more acoustic feature encodings. The one or more acoustic feature encodings are processed by the acoustic feature decoder 506 in accordance with a current set of parameters to output predicted target acoustic features 507.

Model trainer 508 receives the predicted target acoustic features 507 and the "ground-truth" target acoustic features 502, and updates the parameters of acoustic feature encoder 505 and acoustic feature decoder 506 in order to optimize an objective function. The objective function comprises a loss in dependence on the predicted target acoustic features 507 and the ground-truth target acoustic features 502. For example, the loss may measure a mean-squared error between the predicted target acoustic features 507 and the ground-truth target acoustic features 502. The objective function may additionally comprise a regularization term, for example the objective function may be a linear combination of the loss and the regularization term. The objective function may further comprise other weighted losses such as speaker classifier (to emphasize that the target acoustic features have target speaker characteristics) or alignment loss (to emphasize the correct alignment between paired source and target acoustic features). The parameters of the acoustic feature encoder 505 and acoustic feature decoder 506 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad.

The training process is repeated for a number of training examples, and is terminated at a suitable point in time, e.g. when predicted target acoustic features 507 closely match ground-truth target acoustic features 502. After an initial training process, the acoustic feature encoder 505 and acoustic feature decoder 506 may be further trained/refined using target acoustic features 502 determined from player speech samples. Subsequently, the speaker encoder 504, acoustic feature encoder 505 and acoustic feature decoder 506 can be used to convert any source acoustic features into target acoustic features corresponding to the player's voice.

Joint Training Method

Figure 6:
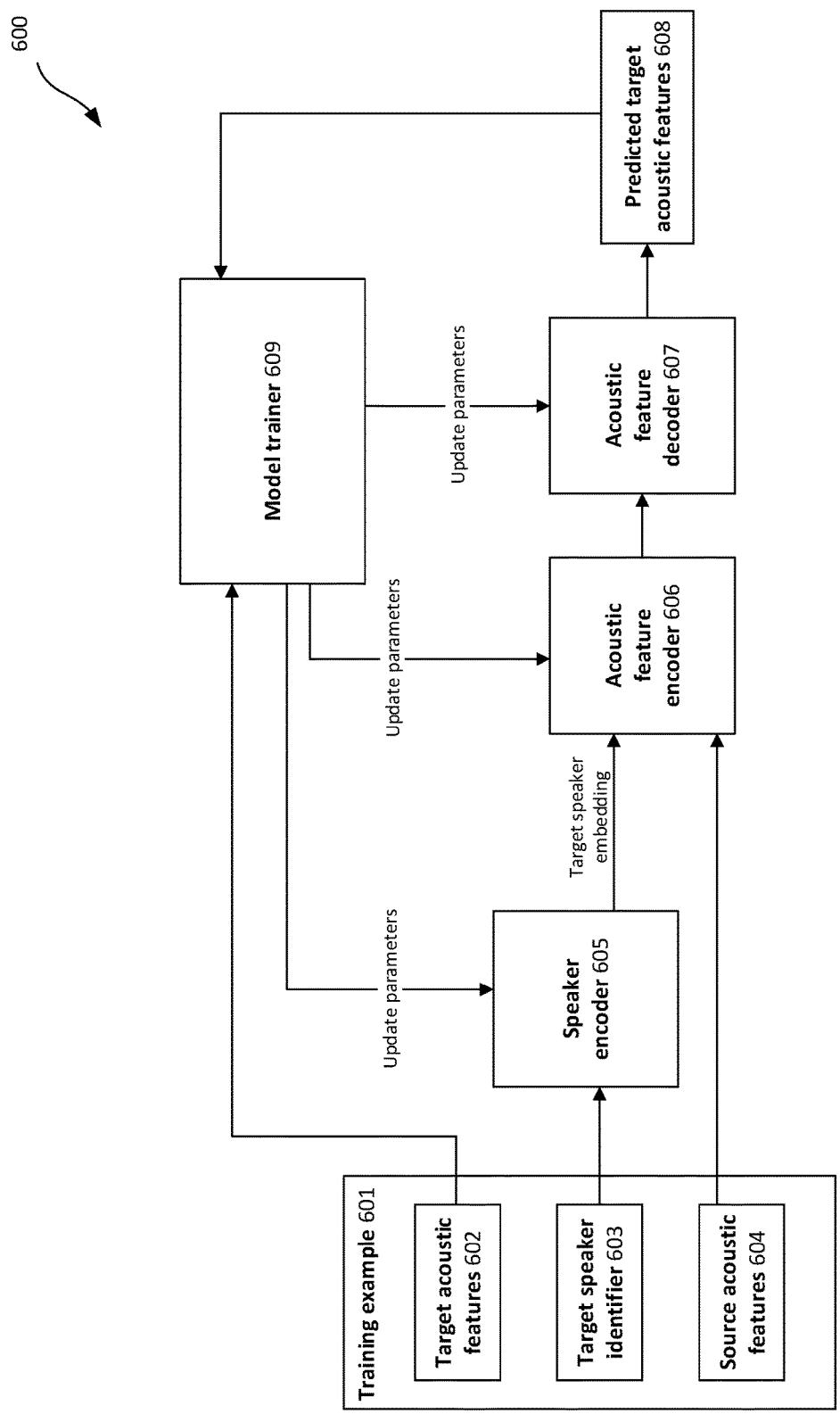
FIG. 6 illustrates an example method for training a speaker encoder, an acoustic feature encoder, and an acoustic feature decoder to generate target acoustic features.

FIG. 6 illustrates an example method 600 for training a speaker encoder, an acoustic feature encoder, and an acoustic feature decoder to generate target acoustic features. In the embodiment depicted in FIG. 6, the speaker encoder 605 is trained jointly with the acoustic feature encoder 606 and acoustic feature decoder 607 on a voice conversion task.

Training example 601 comprises source acoustic features 604, corresponding target acoustic features 602, and a target speaker identifier 603. During training, the goal is to transform source acoustic features 604 of a training example 601 into the target acoustic features 602 of the training example 601. The training example may be referred to as a "paired" training example, wherein the source speech audio (from which the source acoustic features 604 are determined) and the target speech audio (from which the target source acoustic features 602 are determined) differ only in speaker identity. Alternatively said, the content (e.g. the words spoken), the performance, and the timing of the source and target speech audio may closely match each other in a paired training example. The target speaker identifier 603 is a label used to identify the speaker corresponding to target acoustic features 602. Training examples 601 with target acoustic features corresponding to the same speaker have identical target speaker identifiers 603. Target speaker identifiers 603 may be represented by one hot vectors such that a different one-hot vector indicates each speaker in the training set 501. In addition, one or more one-hot vectors may be reserved as target speaker identifiers 603 for speakers to be added later, e.g. for players who wish to synthesize speech audio in their voice.

Target speaker identifier 603 is received by speaker encoder 605, which processes the target speaker identifier 603 in accordance with a current set of parameters and outputs a target speaker embedding for the target speaker.

The target speaker embedding and source acoustic features 604 are received by acoustic feature encoder 606, which processes the received inputs in accordance with a current set of parameters to output one or more acoustic feature encodings. The one or more acoustic feature encodings are processed by the acoustic feature decoder 607 in accordance with a current set of parameters to output predicted target acoustic features 608.

Model trainer 609 receives the predicted target acoustic features 608 and the "ground-truth" target acoustic features 602, and updates the parameters of the speaker encoder 605, acoustic feature encoder 606 and acoustic feature decoder 607 in order to optimize an objective function. The objective function comprises a loss in dependence on the predicted target acoustic features 608 and the ground-truth target acoustic features 602. For example, the loss may measure a mean-squared error between the predicted target acoustic features 608 and the ground-truth target acoustic features 602. The objective function may additionally comprise a regularization term, for example the objective function may be a linear combination of the loss and the regularization term. The parameters of the speaker encoder 605, acoustic feature encoder 606 and acoustic feature decoder 607 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad.

The training process is repeated for a number of training examples, and is terminated at a suitable point in time, e.g. when predicted target acoustic features 608 closely match ground-truth target acoustic features 602. After an initial training process, the speaker encoder 605, acoustic feature encoder 606 and acoustic feature decoder 607 may be further trained/refined using target acoustic features 602 determined from player speech samples. Subsequently, the speaker encoder 605, acoustic feature encoder 606 and acoustic feature decoder 607 can be used to convert any source acoustic features into target acoustic features corresponding to the player's voice.

Figure 7:
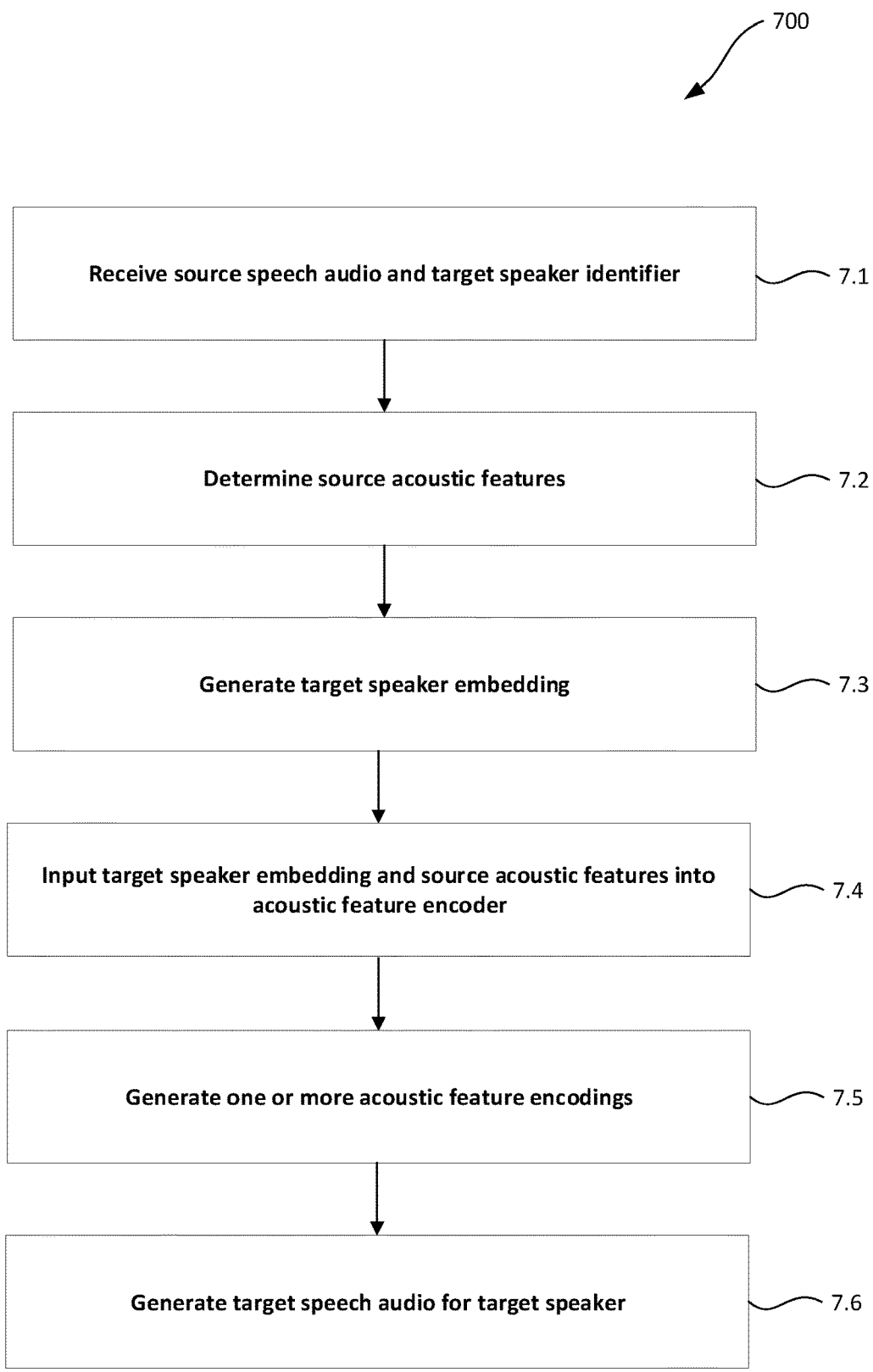
FIG. 7 is a flow diagram illustrating an example method of generating speech audio for use in a video game, wherein the speech audio is generated using a voice convertor that has been trained to convert audio data for a source speaker into audio data for a target speaker.

FIG. 7 is a flow diagram illustrating an example method 700 of generating speech audio for use in a video game, wherein the speech audio is generated using a voice convertor that has been trained to convert audio data for a source speaker into audio data for a target speaker.

In step 7.1, source speech audio and a target speaker identifier are received.

The source speech audio comprises speech content in the voice of a source speaker. The speech content of the source speech audio may include (or be) lexical utterances such as words, non-lexical utterances, or a combination of lexical and non-lexical utterances. Non-lexical utterances may include noises (e.g. a sigh or moan), disfluencies (e.g. um, oh, uk), and the like. Any paralinguistic utterance may form part of the speech content, such as sighs, yawns, moans, laughs, grunts, etc. The source speech audio may be any suitable digital data and may for example represent a waveform of speech audio (e.g. transmitted as an MP3 file, a WAV file, etc). The source speaker may be a speaker whose voice samples were used to initially train the voice convertor.

The target speaker identifier is any data that can be associated with (e.g. used to identify) the target speaker. In some embodiments, the target speaker identifier is a one-hot vector indicating the target speaker. In other embodiments, speech samples (or indications thereof, e.g. acoustic features) provided by the target speaker are used as a speaker identifier. The target speaker may be a player of the video game, or any other speaker whose voice samples were used to train the speech audio generator.

In step 7.2, source acoustic features for the source speech audio are determined. The source acoustic features may comprise any low-level acoustic representation of frequency, magnitude and phase information such as linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof. The source acoustic features may comprise a sequence of vectors, each vector representing acoustic information in a short time period, e.g. 50 milliseconds. Source acoustic features may be determined in any suitable manner, e.g. by performing a Fast Fourier Transform on the source speech audio.

In step 7.3, a target speaker embedding associated with the target speaker identifier is generated as output of a speaker encoder of the voice convertor. The target speaker embedding is a representation of the voice of the target speaker which is associated with the target speaker identifier.

Generating a target speaker embedding associated with the target speaker identifier may comprise inputting, into the speaker encoder, one or more examples of speech audio associated with the target speaker identifier. An embedding for each example of speech audio may be generated as output of the speaker encoder. A target speaker embedding may be generated based on the one or more embeddings. For example, the target speaker embedding may be an average of the one or more embeddings.

Alternatively, generating a target speaker embedding associated with the target speaker identifier may comprise inputting into the speaker encoder, the target speaker identifier. The target speaker embedding may be generated as output of the speaker encoder.

The speaker encoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

In step 7.4, the target speaker embedding and the source acoustic features are inputted into an acoustic feature encoder of the voice convertor. The acoustic feature encoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

In step 7.5, one or more acoustic feature encodings are generated as output of the acoustic feature encoder. The one or more acoustic feature encodings are derived from the target speaker embedding and the source acoustic features. Each of the one or more acoustic feature encodings may comprise a combination of the target speaker embedding and an encoding of the source acoustic features.

Generating the one or more acoustic feature encodings may comprise generating an acoustic feature encoding for each input time step of a plurality of input time steps of the source acoustic features. The acoustic feature encoding for each input time step comprises a combination of the target speaker embedding and an encoding of the source acoustic features for the input time step.

In step 7.6, target speech audio for the target speaker is generated. The target speech audio comprises the speech content in the voice of the target speaker. The generating comprises decoding the one or more acoustic feature encodings using an acoustic feature decoder of the voice convertor.

Decoding the one or more acoustic feature encodings may comprise, for each output time step of a plurality of output time steps: receiving the acoustic feature encoding for each input time step. An attention weight for each acoustic feature encoding may be generated by an attention mechanism. A context vector for the output time step may be generated by the attention mechanism by averaging each acoustic feature encoding using the respective attention weight. The context vector of the output time step may be processed by the acoustic feature decoder to generate target acoustic features for the output time step.

The acoustic feature decoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

The acoustic feature encoder and acoustic feature decoder may be combined as a single encoder-decoder model. For example, they may be combined as an encoder-decoder (e.g. sequence-to-sequence) neural network with or without attention, or as a transformer network, etc. Furthermore, an encoder-decoder model may be implemented by architectures such as Variational Autoencoders (VAEs) and Generative Adversarial Networks (GANs).

The acoustic feature decoder may generate target acoustic features for the speech content in the voice of the target speaker. The target speech audio may be generated by processing the target acoustic features using a vocoder. The vocoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

Additionally or alternatively, the acoustic feature decoder may generate the target speech audio.

Figure 8:
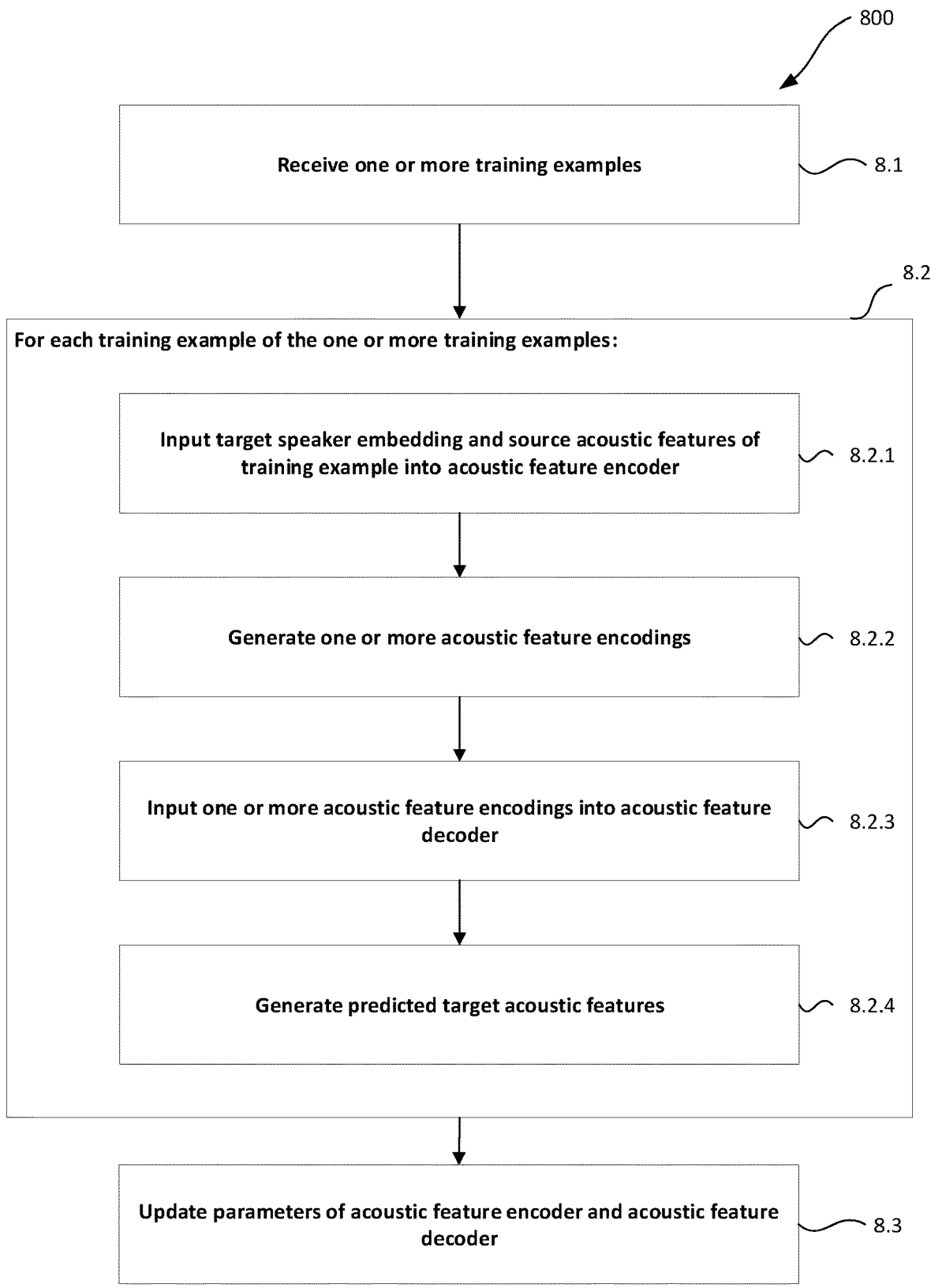
FIG. 8 is a flow diagram is a flow diagram illustrating an example method of training a voice convertor, for use in a video game, to convert acoustic features for a source speaker into acoustic features for a target speaker.

FIG. 8 is a flow diagram illustrating an example method 800 of training a voice convertor, for use in a video game, to convert acoustic features for a source speaker into acoustic features for a target speaker.

In step 8.1, one or more training examples are received. Each training example comprises: (i) source acoustic features for speech content in the voice of the source speaker, and (ii) ground-truth target acoustic features for the speech content in the voice of the target speaker.

Step 8.2 comprises steps 8.2.1, 8.2.2, 8.2.3, and 8.2.4, each of which are performed for each of the one or more training examples.

In step 8.2.1, a target speaker embedding for the training example and the source acoustic features are inputted into an acoustic feature encoder of the voice convertor.

In step 8.2.2, one or more acoustic feature encodings are generated as output of the acoustic feature encoder. The one or more acoustic feature encodings are derived from the target speaker embedding and the source acoustic features. Each of the one or more acoustic feature encodings may comprise a combination of the target speaker embedding and an encoding of the source acoustic features.

In step 8.2.3, the one or more acoustic feature encodings are inputted into an acoustic feature decoder of the voice convertor.

In step 8.2.4, predicted target acoustic features for the training example are generated as output of the acoustic feature decoder.

In step 8.3, parameters of the acoustic feature encoder and the acoustic feature decoder are updated based on an objective function. The objective function comprises a comparison between the predicted target acoustic features and the ground-truth target acoustic features.

The target speaker embedding may be generated by a speaker encoder of the voice convertor that has been trained separately to the acoustic feature encoder and the acoustic feature decoder. The separate training of the speaker encoder may comprise receiving one or more further training examples. Each further training example may comprise: (i) acoustic features for speech content in the voice of a speaker, and (ii) a speaker identifier for the speaker. For each further training example of the one or more training examples, the acoustic features may be inputted into the speaker encoder. A speaker embedding for the further training example may be generated as output of the speaker encoder. Parameters of the speaker encoder may be updated based on a further objective function. The further objective function may depend on the speaker embedding and the speaker identifier. The further objective function may comprise a similarity metric that measures the similarity of the generated speaker embeddings of the further training examples. For example, the similarity metric may be a cosine similarity.

Alternatively, the target speaker embedding may be generated by a speaker encoder of the voice convertor that is being trained jointly with the acoustic feature encoder and the acoustic feature decoder. Each training example may further comprise a target speaker identifier for the target speaker, and the joint training of the speaker encoder may comprise, for each training example of the one or more training examples, inputting, into the speaker encoder, the target speaker identifier of the training example. A target speaker embedding may be generated as output of the speaker encoder. Parameters of the speaker encoder may be updated based on the objective function.

The method 800 may further comprise receiving target acoustic features for speech content in the voice of a player of the video game. The received target acoustic features may be associated with the source acoustic features of a particular training example. Predicted target acoustic features may be generated by converting the source acoustic features using the voice convertor. Parameters of the acoustic feature decoder and the acoustic feature encoder may be updated based on the objective function.

Figure 9:
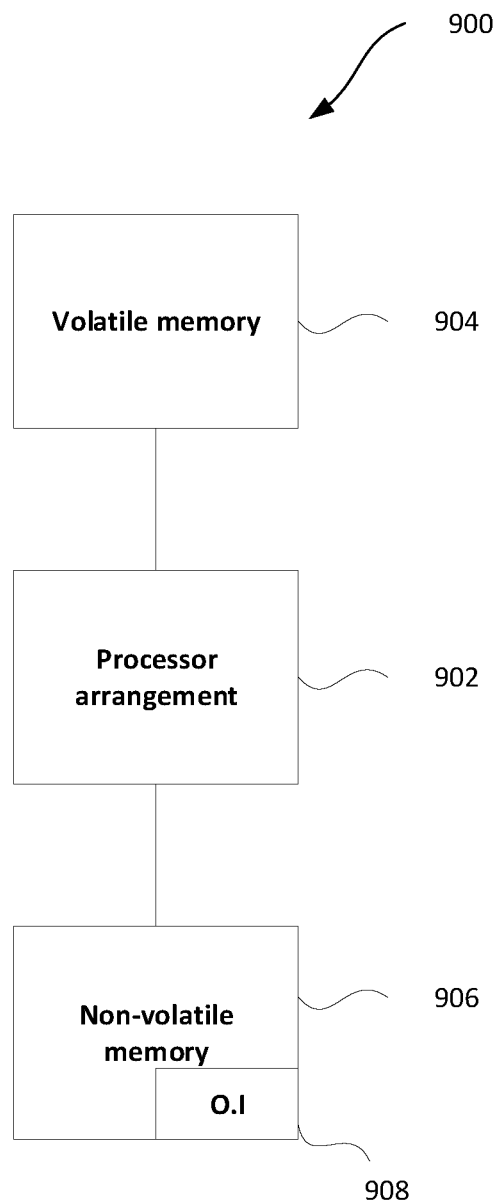
FIG. 9 shows a schematic example of a system/apparatus for performing any of the methods described herein.

FIG. 9 shows a schematic example of a system/apparatus for performing methods described herein. The system/apparatus shown is an example of a computing device. It will be appreciated by the skilled person that other types of computing devices/systems may alternatively be used to implement the methods described herein, such as a distributed computing system.

The apparatus (or system) 900 comprises one or more processors 902. The one or more processors control operation of other components of the system/apparatus 900. The one or more processors 902 may, for example, comprise a general purpose processor. The one or more processors 902 may be a single core device or a multiple core device. The one or more processors 902 may comprise a central processing unit (CPU) or a graphical processing unit (GPU). Alternatively, the one or more processors 902 may comprise specialised processing hardware, for instance a RISC processor or programmable hardware with embedded firmware. Multiple processors may be included.

The system/apparatus comprises a working or volatile memory 904. The one or more processors may access the volatile memory 904 in order to process data and may control the storage of data in memory. The volatile memory 904 may comprise RAM of any type, for example Static RAM (SRAM), Dynamic RAM (DRAM), or it may comprise Flash memory, such as an SD-Card.

The system/apparatus comprises a non-volatile memory 906. The non-volatile memory 906 stores a set of operation instructions 908 for controlling the operation of the processors 902 in the form of computer readable instructions. The non-volatile memory 906 may be a memory of any kind such as a Read Only Memory (ROM), a Flash memory or a magnetic drive memory.

The one or more processors 902 are configured to execute operating instructions 908 to cause the system/apparatus to perform any of the methods described herein. The operating instructions 908 may comprise code (i.e. drivers) relating to the hardware components of the system/apparatus 900, as well as code relating to the basic operation of the system/apparatus 900. Generally speaking, the one or more processors 902 execute one or more instructions of the operating instructions 908, which are stored permanently or semi-permanently in the non-volatile memory 906, using the volatile memory 904 to temporarily store data generated during execution of said operating instructions 908.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 9, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

The invention claimed is:

1. A computer-implemented method of generating speech audio for use in a video game, wherein the speech audio is generated using a voice convertor that has been trained to convert audio data for a source speaker into audio data for a target speaker, the method comprising:
  receiving: (i) source speech audio, wherein the source speech audio comprises speech content in the voice of the source speaker, and (ii) a target speaker identifier;
  determining source acoustic features for the source speech audio;
  generating, as output of a speaker encoder of the voice convertor, a target speaker embedding associated with the target speaker identifier;
  inputting the target speaker embedding and the source acoustic features into an acoustic feature encoder of the voice convertor;
  generating, as output of the acoustic feature encoder, one or more acoustic feature encodings derived from the target speaker embedding and the source acoustic features; and
  generating target speech audio for the target speaker, wherein the target speech audio comprises the speech content in the voice of the target speaker, the generating comprising decoding the one or more acoustic feature encodings using an acoustic feature decoder of the voice convertor.

2. The method of claim 1, wherein each of the one or more acoustic feature encodings comprise a combination of the target speaker embedding and an encoding of the source acoustic features.

3. The method of claim 1, wherein generating the one or more acoustic feature encodings comprises generating an acoustic feature encoding for each input time step of a plurality of input time steps of the source acoustic features, wherein the acoustic feature encoding for each input time step comprises a combination of the target speaker embedding and an encoding of the source acoustic features for the input time step.

4. The method of claim 3, wherein decoding the one or more acoustic feature encodings comprises, for each output time step of a plurality of output time steps:
  receiving the acoustic feature encoding for each input time step;
    generating, by an attention mechanism, an attention weight for each acoustic feature encoding;
  generating, by the attention mechanism, a context vector for the output time step by averaging each acoustic feature encoding using the respective attention weight; and
  processing, by the acoustic feature decoder, the context vector of the output time step to generate target acoustic features for the output time step.

5. The method of claim 1, wherein the acoustic feature decoder generates target acoustic features for the speech content in the voice of the target speaker, and the target speech audio is generated by processing the target acoustic features using a vocoder.

6. The method of claim 1, wherein generating, as output of the speaker encoder of the voice convertor, the target speaker embedding associated with the target speaker identifier comprises:
  inputting, into the speaker encoder, one or more examples of speech audio associated with the target speaker identifier;
  generating, as output of the speaker encoder, an embedding for each example of speech audio; and
  generating the target speaker embedding based on the one or more embeddings.

7. The method of claim 1, wherein generating, as output of the speaker encoder of the voice convertor, the target speaker embedding associated with the target speaker identifier comprises:
  inputting, into the speaker encoder, the target speaker identifier; and
  generating, as output of the speaker encoder, the target speaker embedding.

8. The method of claim 1, wherein the target speaker is a player of the video game.

9. A computer-implemented method of training a voice convertor, for use in a video game, to convert acoustic features for a source speaker into acoustic features for a target speaker, the method comprising:
- receiving one or more training examples, each training example comprising: (i) source acoustic features for speech content in the voice of the source speaker, and (ii) ground-truth target acoustic features for the speech content in the voice of the target speaker;
- for each training example of the one or more training examples:
  - inputting, into an acoustic feature encoder of the voice convertor, a target speaker embedding for the training example and the source acoustic features;
  - generating, as output of the acoustic feature encoder, one or more acoustic feature encodings derived from the target speaker embedding and the source acoustic features;
  - inputting, into an acoustic feature decoder of the voice convertor, the one or more acoustic feature encodings; and
  - generating, as output of the acoustic feature decoder, predicted target acoustic features for the training example; and
- updating parameters of the acoustic feature encoder and the acoustic feature decoder based on an objective function, wherein the objective function comprises a comparison between the predicted target acoustic features and the ground-truth target acoustic features.

10. The method of claim 9, wherein the target speaker embedding is generated by a speaker encoder of the voice convertor that has been trained separately to the acoustic feature encoder and the acoustic feature decoder.

11. The method of claim 10, wherein the separate training of the speaker encoder comprises:
- receiving one or more further training examples, each further training example comprising: (i) acoustic features for speech content in the voice of a speaker, and (ii) a speaker identifier for the speaker;
- for each further training example of the one or more further training examples:
  - inputting, into the speaker encoder, the acoustic features; and
  - generating, as output of the speaker encoder, a speaker embedding for the further training example; and
- updating parameters of the speaker encoder based on a further objective function, wherein the further objective function depends on the speaker embedding and the speaker identifier.

12. The method of claim 11, wherein the further objective function comprises a similarity metric that measures the similarity of the generated speaker embeddings of the further training examples.

13. The method of claim 9, wherein the target speaker embedding is generated by a speaker encoder of the voice convertor that is being trained jointly with the acoustic feature encoder and the acoustic feature decoder.

14. The method of claim 13, wherein each training example further comprises a target speaker identifier for the target speaker, and the joint training of the speaker encoder comprises:
- for each training example of the one or more training examples:
  - inputting, into the speaker encoder, the target speaker identifier of the training example; and
  - generating, as output of the speaker encoder, the target speaker embedding; and
- updating parameters of the speaker encoder based on the objective function.

15. The method of claim 9, further comprising:
- receiving target acoustic features for speech content in the voice of a player of the video game, wherein the received target acoustic features are associated with the source acoustic features of a particular training example;
- generating, using the voice convertor, predicted target acoustic features by converting the source acoustic features; and
- updating the parameters of the acoustic feature decoder and the acoustic feature encoder based on the objective function.

16. A non-transitory computer-readable medium storing instructions, which when executed by a processor, cause the processor to:
- receive source speech audio, wherein the source speech audio comprises speech content in the voice of a source speaker;
- determine source acoustic features for the source speech audio;
- input a target speaker embedding for a target speaker and the source acoustic features into an acoustic feature encoder of a voice convertor;
- generate, as output of the acoustic feature encoder, one or more acoustic feature encodings derived from the target speaker embedding and the source acoustic features; and
- generate target speech audio for the target speaker, wherein the target speech audio comprises the speech content in the voice of the target speaker, the generating comprising decoding the one or more acoustic feature encodings using an acoustic feature decoder of the voice convertor.

17. The non-transitory computer-readable medium of claim 16, wherein the target speaker embedding is generated from an output of a speaker encoder of the voice convertor, the generating comprising:
- inputting, into the speaker encoder, one or more examples of speech audio associated with the target speaker;
- generating, as output of the speaker encoder, an embedding for each example of speech audio; and
- generating the target speaker embedding based on the one or more embeddings.

18. The non-transitory computer-readable medium of claim 16, wherein the target speaker embedding is generated as an output of a speaker encoder of the voice convertor, the generating comprising:
- inputting, into the speaker encoder, a target speaker identifier associated with the target speaker; and
- generating, as output of the speaker encoder, the target speaker embedding.

19. The non-transitory computer-readable medium of claim 16, wherein the target speaker embedding is generated by combining two or more different speaker embeddings.

20. The non-transitory computer-readable medium of claim 19, wherein combining the two or more different speaker embeddings comprises summing the two or more different speaker embeddings together.

* * * * *